INVENTOR:
ALFRED G. ROUSSIN,
BY [signature]
HIS ATTORNEY.

INVENTOR:
ALFRED G. ROUSSIN,
BY Julius J. Zaskalicky
HIS ATTORNEY.

INVENTOR:
ALFRED G. ROUSSIN,

BY Julius J. Zaskalicky
HIS ATTORNEY

United States Patent Office 3,423,625

Patented Jan. 21, 1969

3,423,625

ELECTRON BEAM SYSTEM

Alfred G. Roussin, Syracuse, N.Y., assignor to General Electric Company, a corporation of New York Filed Sept. 27, 1965, Ser. No. 490,503
U.S. Cl. 315—16 10 Claims
Int. Cl. H01j 29/46, 29/56

ABSTRACT OF THE DISCLOSURE

Electrode arrangements and modes of operation thereof in an electron beam system for use in a light valve projector to provide the functions of electron beam modulation, deflection, and focus. Two sets of generally rectangular electrodes having their centers in a common plane traverse to the undeflected electron beam path are used, the sets being longitudinally spaced along the beam and one set being closer to the beam path than the other. Each set includes a pair of horizontal and a pair of vertical deflection electrodes, to which modulating, deflecting, and focusing signals are applied.

The invention relates to an improved electron beam system including means for the modulation, focusing and deflection of the beam thereof and particularly to such a system providing improved modulation and dynamic focus thereof. The present invention is particularly suited to systems for intelligence modulating an electron beam and scanning it over an area to produce an output which conveys the intelligence.

The present invention represents improvements in the system disclosed in U.S. patent application Serial No. 471,993, filed July 14, 1965, now Patent No. 3,320,468 dated May 16, 1967, and assigned to the assignee of the present invention. In an electron beam focusing and deflection system the best balance between the demagnification obtainable from the focusing system and the deflection angle required for scanning a given area is obtained by combining the focusing and deflection functions in one system of electrodes. The combination of deflection and focusing voltages on a set of electrodes modifies the focusing field with the variation in deflection voltage so that the center of focus shifts with these deflection voltages. If the beam merely enters the focusing field at the center of the structure, this shifting of the center of focus in accordance with the deflection voltages causes rather severe deflection aberration in the scanned area and is detrimental, particularly in information or in intelligence transducing systems.

In accordance with one aspect of the present invention improved means are provided for imparting a predeflection in the same direction as the main deflection and of suitable magnitude so that the entry of the beam into the focusing field follows the shift in the center of focus of the focusing field produced by the main deflection voltages.

Electron beams have been modulated wth intelligence signals such as signals including color television picture information, example, and scanned over an area of a light modulating medium to produce in the medium a distribution of diffraction gratings capable of deviating light and cooperating with a projection system to reproduce the information as a projected image. To produce an image of good color requires that the beam remain well focused in both the horizontal and vertical directions as it is scanned over an area, and that the parameters of the modulating medium have a substantially linear relation to the corresponding parameters of the modulating signals over the scanned area.

In accordance with another aspect of the present invention there is provided improved modulating as well as focusing and deflecting arrangements for an electron beam particularly applicable to systems of the above-referred-to-type and when so applied the arrangements produce not only improved quality in the projected image but enable such improved quality to be obtained with simpler means.

In accordance with an illustrative embodiment of the present invention the electron beam is controlled by two sets of generally rectangular electrodes having the centers of the electrodes lying in a common plane transverse to the undeflected electron beam path and with sets of the electrodes longitudinally spaced along the beam. One set of electrodes adjacent to the electron beam source are placed closer to the electron beam path than the other set of electrodes and may be utilized for electron beam centering and shaping as well. The electrodes of the first set are divided into opposed pairs, one pair being utilized for horizontal predeflection of the electron beam and the orthogonally arranged pair energized to provide vertical predeflection thereof. The electrodes of the second set are also divided into opposed pairs, one pair being utilized for horizontal deflection and the orthogonally arranged pair being utilized for vertical deflection. The vertical and horizontal focusing fields are produced by direct current voltages impressed between the corresponding electrodes of the two sets and between the electrodes of the second set, i.e., the set nearer the image area, and the conductive surface supporting the modulating medium. The dimensions of and the voltages of these electrodes are correlated to minimize aberrations and to produce a sharply focused beam over the full deflection area. In addition, modulating voltages are applied to the horizontal and vertical deflection plates of the first set to modulate the beam in accordance with color signal information.

In accordance with another illustrative embodiment of the present invention more precise deflection is provided by location of an additional set of generally rectangular electrodes having their centers lying in a common plane transverse to the undeflected beam path between the aforementioned first and second set of electrodes. With such an arrangement more precise predeflection can be imparted to the electron beam to assure a sharply focused beam over the full deflection area as well as a linear relationship between the charge pattern produced at the raster area and the intelligence signals applied to the electrodes.

When modulating signals for modulating the electron beam in both horizontal and vertical directions are applied to a set of electrodes, for example the first set aforementioned, a certain degree of interaction occurs in the resulting modulation. In accordance with a further feature of the present invention signals for horizontally modulating the electron beam are applied to the appropriate electrodes of one set and the signals for vertically modulating the electron beam are applied to appropriate electrodes of another set, for example the second set.

The objects and advantages which characterize my invention will become more apparent as the following description proceeds reference being had to the accompanying drawings, and the scope will be pointed out in the appended claims.

Figure 1:
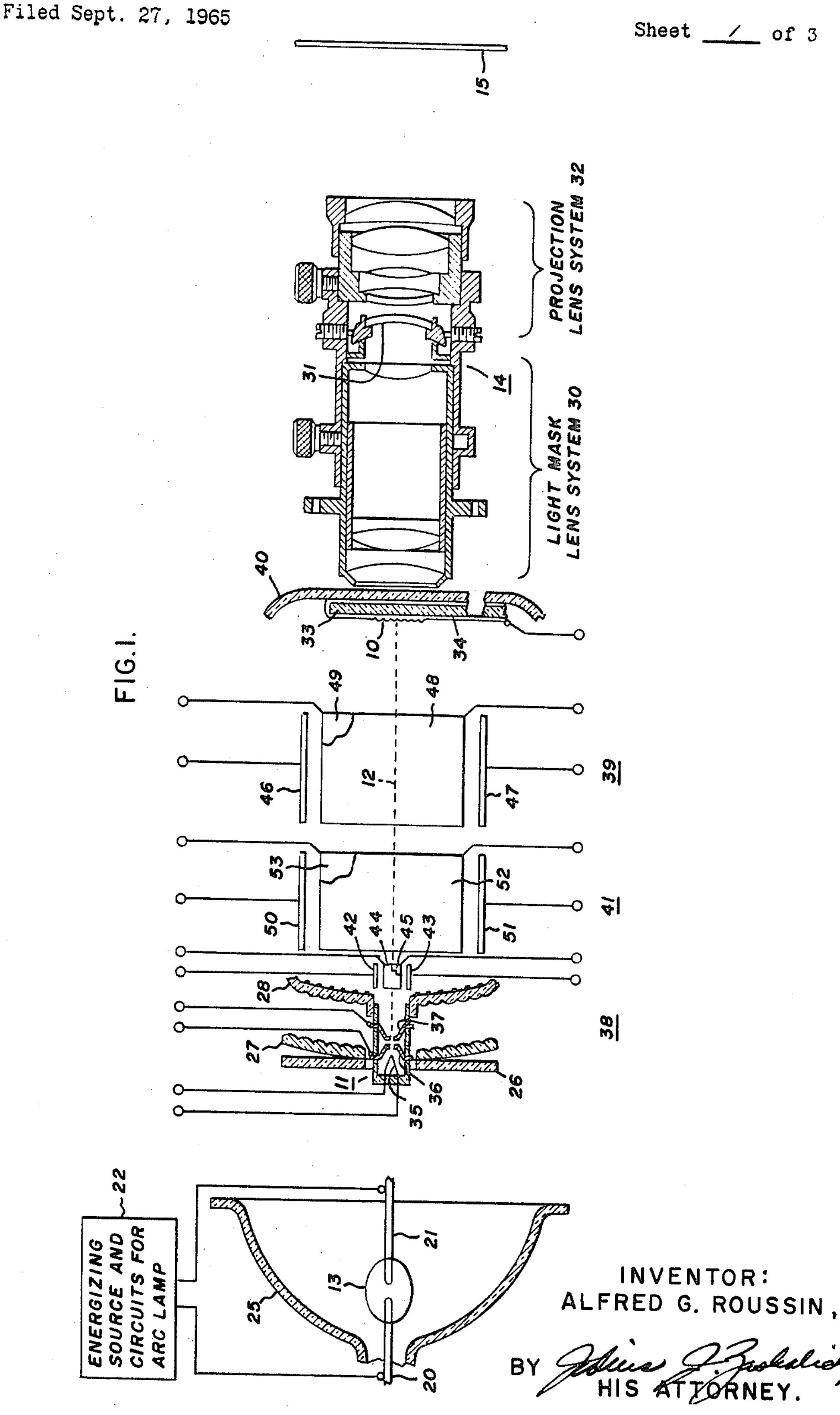
FIGURE 1 is an elevation view in section illustrating an electron beam writing and projection apparatus useful in explaining embodiments of my invention.

Referring now to FIGURE 1 there is shown apparatus for simultaneous color projection comprising an optical channel including a light modulating medium 10, and an electrical channel including an electron beam device 11 producing a beam of electrons 12 which impinges on the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity in each of the three primary color constituents of an image to be projected are applied to the electron beam device 11 to modulate the beam thereof in the manner to be more fully described below, to produce deformations in the light modulating medium in the form of three diffraction gratings, more fully described in patent application, Ser. No. 381,634, filed July 10, 1964, now Patent No. 3,305,630 dated February 21, 1967, and assigned to the assignee of the present invention which modify the light transmitted by the modulating medium in point by point correspondence with the image to be projected. A light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed by the production of a diffraction grating therein of appropriate amplitude, light is deflected or deviated by the light modulating medium, passes through the slots in the output mask member 31, and is projected by the projection lens system 32 onto the screen 15. The details of the light input optics of the light valve projection system shown in FIGURE 1 are described in copending patent application Ser. No. 316,606, filed Oct. 16, 1963, now Patent No. 3,330,908 dated July 11, 1967, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, now Patent No. 3,328,111 dated June 27, 1967, and assigned to the assignee of the present invention.

The viscous light modulating medium 10 is supported on transparent member 33 coated with a transparent conductive layer 34 adjacent the medium such as indium oxide. The viscosity and other properties of the light modulating medium are selected such that the deposited charges produce the desired deformations in the surface and such that the amplitude of the deformations decay to a small value after each field of scan thereby permitting alternate variations in amplitude of the diffraction grating at the sixty cycle per second field scanning rate. The conductive layer is maintained at ground potential and constitutes the target electrode for the electron beam writing system.

Three phase diffraction gratings are formed in the light modulating medium 10 each corresponding to a respective one of the primary colors red, blue and green in the color image to be projected. Two of the phase diffraction gratings corresponding to the red and blue colors are of constant line to line spacing and have lines oriented in vertical direction in the apparatus of FIGURE 1. The other diffraction grating corresponding to the green component is also of constant line to line spacing and is horizontally oriented, i.e., in the direction corresponding to the lines of horizontal scan. Each of the diffraction gratings are of different line to line spacing and are arranged with respect to the slots and bars of the output mask such that when a particular grating is formed light is deviated so as to pass through the slots of the output mask on a point by point basis on to the projection screen, the magnitude of such light on a point by point basis varying in accordance with the amplitude of the grating at the particular point thereof on which light is incident.

Figure 2:
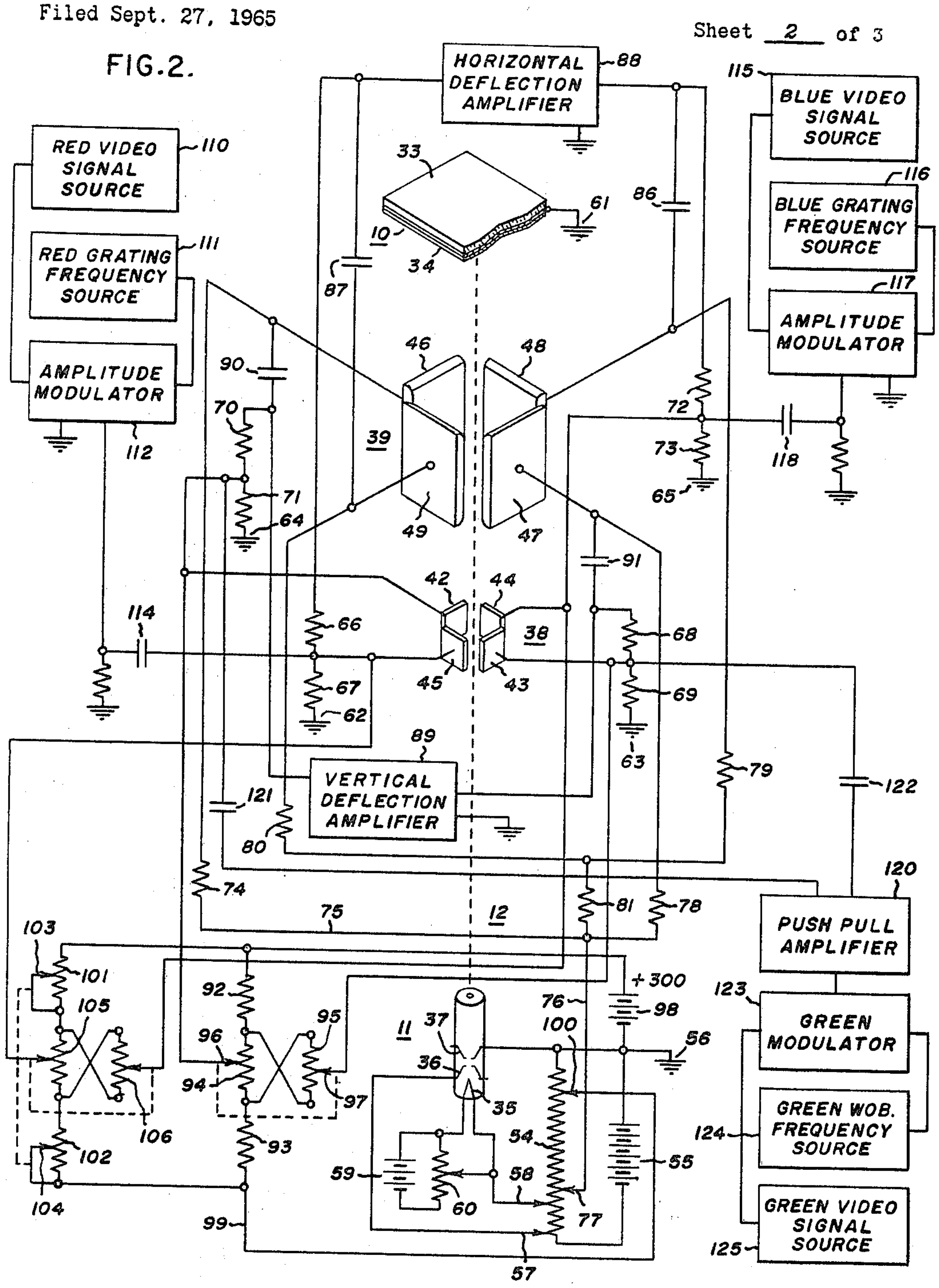
FIGURE 2 is a schematic illustration of an electron beam focusing, deflection and modulating system embodying my invention and utilizing the apparatus of FIGURE 1.
Figure 3:
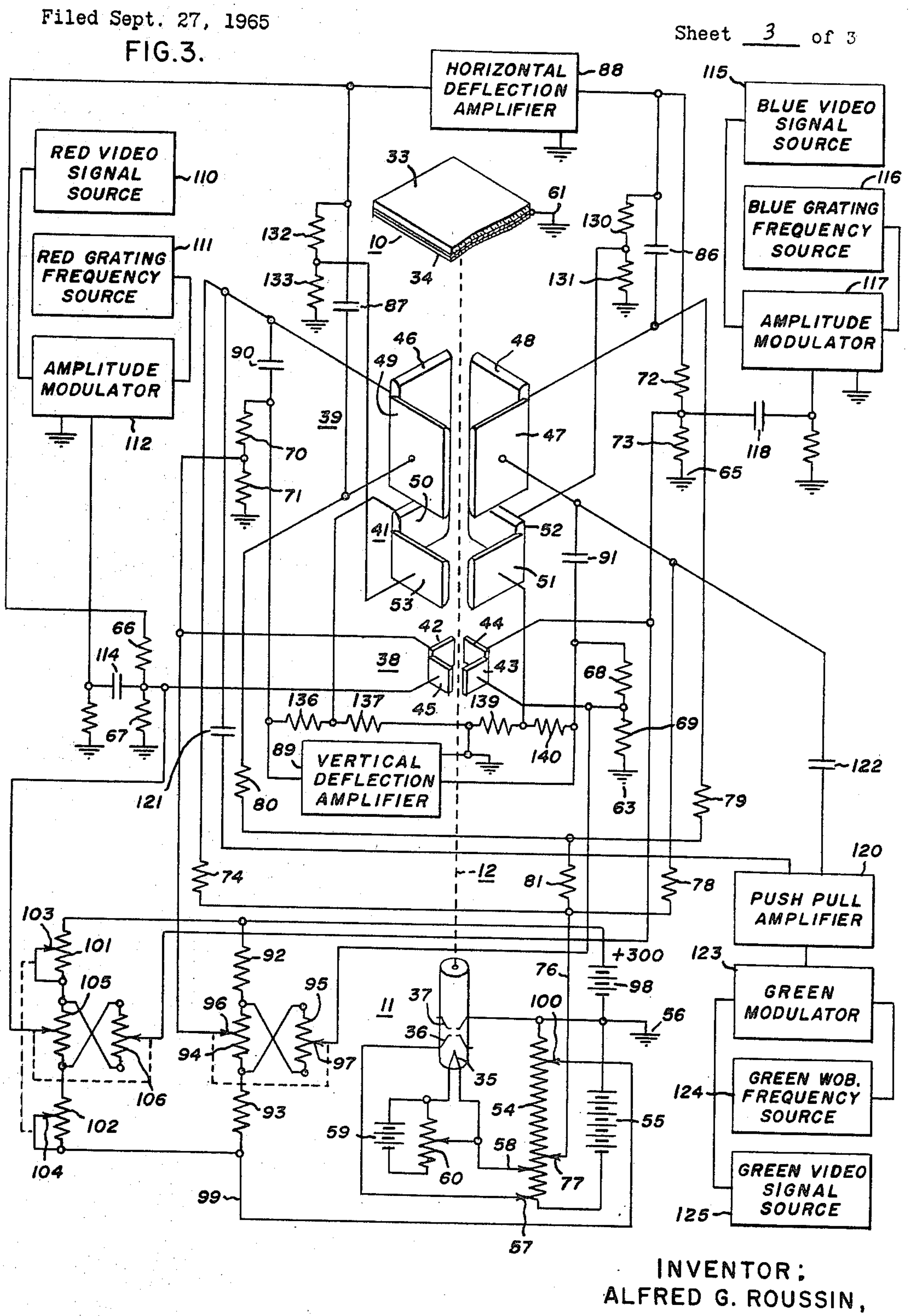
FIGURE 3 is an elevation view in section of another embodiment of an electron beam system for focusing, deflection and modulation of an electron beam in accordance with my invention and utilizing the apparatus of FIGURE 1.

The electrode system for producing an electron beam appropriately focused, deflected and modulated for producing the three diffraction gratings mentioned above is shown in FIGURE 1, and the manner of operation thereof is illustrated in the embodiments of FIGURES 2 and 3. The electrode system utilized for depositing charge on the light modulating medium which in turn produces the appropriate deformations constituting the phase diffraction gratings thereon comprise an evacuated enclosure 40 in which are included an electron beam generating device having a cathode 35, a control electrode 36, and a first anode 37, a first set 38 of electrodes, a second set 39 of electrodes and additional set of electrodes 41. The first set 38 of electrodes function, in addition to providing electron beam centering and shaping, provide predeflection and modulation of the electron beam in both the horizontal and vertical directions. The second set 39 of electrodes provides principal deflection of the electron beam in the horizontal and vertical direction to scan the beam thereof over the active area of the light modulating medium. The additional set 41 of electrodes located between the first and second sets of electrodes provide more precise predeflection of the electron beam, and also provide in conjunction with the electrodes of the first set a means by which the modulations of the electron beam in each of two orthogonally arranged directions may be isolated. Each of the three electrode sets include four electrodes supported in orthogonally arranged pairs with the centers of electrodes of each set lying substantially in a common plane transverse to the undeflected electron beam path. In set 38 opposed electrodes 42 and 43 are designated vertical deflecting electrodes and the second pair of opposed electrodes 44 and 45 are orthogonally arranged with respect to electrodes 42 and 43 and are designated horizontal deflecting electrodes. Similarly, in set 39 electrodes 46 and 47 may be considered vertical deflection electrodes and electrodes 48 and 49 may be considered horizontal deflection electrodes, and further in set 41 electrodes 50 and 51 may be considered vertical deflection electrodes and electrodes 52 and 53 may be considered horizontal deflection electrodes.

As will become apparent from a consideration of the operation of the system in connection with the description of FIGURES 2 and 3, the electrode sets 38 and 39 in cooperation with the conductive supporting surface 34 for the light modulating medium function as the longitudinally spaced electrodes of a three element electrostatic focusing lens system. Also, as specifically illustrated in FIGURE 3 the electrodes sets 39 and 41 in cooperation with the conductive supporting surface 34 for the light modulating medium function as the longitudinally spaced electrodes of a three element electrostatic focusing system.

The operation of the electron beam system will now be described in connection with the schematic illustration of FIGURE 2 wherein the parts corresponding to those earlier described in connection with FIGURE 1 have been designated by the same reference numerals. As illustrated in FIGURE 2 the direct current voltages for energizing the various electrodes of the system are obtained from taps on a voltage dividing resistor 54 connected across the terminals of a direct current voltage source illustrated schematically as a battery 55. The positive terminal of the supply is grounded as illustrated at 56 and is also connected to the anode 37 of the electron gun 11. The grid terminal 36 is connected with a point on the resistor 54 by conductor 57 which is negative with respect to the point of connection of conductor 58 which is connected to cathode 35 and determines the direct current cathode potential. The filamentary cathode 35 is heated by an adjustable direct current voltage derived from battery 59 and voltage dividing resistor 60. The conducting layer 34 of thhe light modulating medium is maintained at ground potential by the connection 61. The set 38 of deflecting and focusing electrodes is maintained at direct current reference potential close to ground potential. The electrodes 42–45 of set 38 are connected to ground as shown at 64, 63, 65, and 62, respectively. Each of the circuits from the electrodes 42–45 to ground include in series resistors which have been designated by the numerals 71, 69, 73 and 67, respectively. The electrodes of set 39 are all maintained at substantially the same direct current potential which is negative with respect to ground potential and the electrode set 38. As illustrated, electrode 46 is connected through resistor 74, conductor 75 and conductor 76 to a tap 77 on resistor 54. In a similar manner electrode 47 is connected through resistor 78 and conductor 75 to the tap 77. The opposed pairs of electrodes 48 and 49 of set 39 are also connected through respective resistors 79 and 80 to one end of resistor 81, the other end of which is connected to branch circuit 75.

Horizontal deflection voltages are applied to electrodes 48 and 49 of set 39 through capacitors 86 and 87 and through voltage divider networks consisting of resistors 72 and 73 resistors 66 and 67, respectively, to electrodes 44 and 45 from a source of the deflection voltage illustrated schematically at 88. Similarly, vertical deflection voltage is supplied from vertical deflection amplifier 89 through capacitors 90 and 91 to electrodes 46 and 47 and through voltage divider networks consisting of resistors 70 and 71 and consisting of resistors 68, 69, respectively, to electrodes 42 and 43.

As will be readily appreciated by those skilled in the art, the electron gun 11 and the associated circuit as described above is effective to provide and accelerate an electron beam toward the electron receiving surface of the medium 10 on which in its undeflected path passes through the center of the focusing and deflection electrodes 38 and 39. The electrodes of set 38 and the conductive surface 34 are the outside lens members of a three element electrostatic lens system and as illustrated are maintained at a direct current potential which may be equal or close to the final positive voltage of the electron beam. The intermediate electrode set 39 is maintained at a substantial negative voltage with respect to electrodes 38 and 34 and may, for example, be about three-quarters of the total beam voltage negative, for example 10,000 volts, with respect to the anode as determined by tap 77 on voltage dividing resistor 54. It is apparent that this lens system will serve to focus the electron beam. In order to provide the best balance between the spot demagnification by the focusing system and the deflection angle, the focusing and deflection functions are combined in this electrode set 39. The horizontal and vertical deflection voltage sources may provide voltages of the periodicity normally used in television deflection circuits, for example. The horizontal deflection voltage is applied to the electrodes 48 and 49 of set 39 to provide the main horizontal deflection and also to the electrodes 44 and 45 of set 38 to provide a predeflection, that is the deflection of the beam before it enters the focusing field produced between the electrode set 38 and electrode set 39. In a similar manner the vertical deflection voltage is applied to the electrodes 46 and 47 of the electrode set 39 and also to the predeflection electrodes 42 and 43 of the set 38. The presence of the deflection voltages on the main deflection electrodes of set 39 produces a distortion of the focusing field or a movement of the center of focus of the focusing field. In order to minimize or eliminate the effect of this dynamic change in the focusing field, the beam is given a predeflection, that is a deflection before it enters the focusing field in the same direction as the deflection produced by the main deflection electrodes of set 39 and in an amount which tends to introduce the beam into the focusing field at the dynamic center of focus.

The centering and beam cross section control is accomplished by means of electrode set 38. As shown, the circuit for energizing the vertical centering electrodes 42 and 43 includes a series circuit having resistors 92 and 93 connected in series with parallel connected potentiometers 94 and 95 between the resistors 92 and 93. As illustrated, taps 96 and 97 of the potentiometers are mechanically coupled to be moved simultaneously and, in order that movement of these taps produce an increase in the voltage on one tap in a positive direction as the voltage on the other tap increases in a negative direction, the potentiometers 94 and 95 have been shown cross-connected. These taps 96 and 97 are connected respectively with centering electrodes 42 and 43. The series connected resistors and potentiometers are energized from direct current voltages which are approximately 200–300 volts above and below ground. As illustrated, the terminal of resistor 92 is indicated connected to a 300 volt positive direct current supply provided, for example, by battery 98 while the lower terminal of resistor 93 is connected by conductor 99 to an adjustable tap 100 on a potentiometer 54, th's voltage also being adjusted to a position the order of approximately 300 volts negative. It is apparent that at the mid position of taps 96 and 97 the centering electrodes are at the same potential and at ground potential. Movement of the taps upwardly renders electrode 43 positive with respect to electrode 42 with the increase in positive potential of electrode 43 being equal to the decrease in positive potential of electrode 42, so that midway between the two electrodes the voltage is essentially that of ground.

The circuit for energizing the horizontal electrodes 44 and 45 is essentially the same as that described in connection with the vertical centering electrodes 42 and 43 except that resistors 92 and 93 have been replaced by variable resistors 101 and 102 having adjustable taps 103 and 104, respectively. These taps are mechanically connected together for movement in unison so that as resistance 101 is increased, resistance 102 is decreased. This leaves the voltage across cross-connected potentiometers 105 and 106, which are connected in series with potentiometers 101 and 102, constant with the adjustment of these taps. Taps 103 and 104 make it possible to change the voltage of the horizontal electrodes 44 and 45 in either a positive or negative direction in unison relative to those of the vertical electrodes 42 and 43 to control the relative cross sectional dimensions of the electron beam.

While electrodes of set 38 are shorter in the length of the tube, they are closer to the electron beam and the beam has a longer travel to the main deflection for a given voltage. For this reason, voltages from the deflection voltage source are suitably reduced in magnitude for energizing the centering electrodes. This is accomplished by suitable voltage divider circuits energized by the deflection voltage supplies. Voltage divider consisting of resistors 70 and 71 supplies such a voltage to electrode 42. Similarly resistors 68, 69, resistors 72, 73 and resistors 66, 67, supply such voltages to electrodes 43, 44 and 45 respectively. Resistors 70, 68, 72, and 66 also isolate carrier frequency voltages from the deflection supplies 88 and 89.

In the system illustrated in FIGURES 1 and 2 information is impressed on the modulating medium in accordance with input signals such as color television picture signals. Because of the importance of a well focused small electron beam, which may be deflected over a substantial angle without aberration, to the successful operation of such a system, the present invention is of particular use in systems of this type. The modulation of the beam in accordance with the color information will be briefly described. Red video signals supplied by source 110 and the output of the red grating frequency source 111 having a frequency of 16 megacycles, for example, are combined in the amplitude modulator 112 to provide an output voltage of the frequency of source 11 and an amplitude dependent upon the amplitude of red video signal. This voltage is impressed on the horizontal deflection plate 45 through capacitor 114 which isolates the color information circuit from the direct current voltage of the deflection electrode 45. In a similar manner the blue video signal from source 115 and the output of blue grating frequency source 116 having a suitable frequency, such as 12 megacycles, is combined in amplitude modulator 117 and impressed on the opposed horizontal deflection plate 44 through capacitor 118. The effect of these voltages superimposed on the horizontal deflection voltage is to velocity modulate the beam in accordance with these two frequencies by amounts dependent upon the amplitudes of the red and blue video signals to provide increases and decreases in the charge density along the raster lines at spacings determined by the frequencies of the sources 111 and 116 and by amounts dependent upon the amplitudes of the red and blue video signals. As is well understood by those skilled in the art and explained above, this type of electron beam control produces deformations in the medium 10 capable of diffracting light and, in combination with a suitable optical system, capable of reproducing color information in a projected image. It will also be understood that these voltages applied, respectively, to electrodes 44 and 45 may be combined in a voltage adding circuit and applied to electrodes 44 and 45 in push-pull. In a similar manner the green video information is impressed on the vertical deflection plates 42 and 43 from the output of a push-pull amplifier 120 through blocking capacitors 121 and 122. The push-pull amplifier 120 is energized by the output of an amplitude modulator 123 which is a voltage wave having a frequency determined by green wobbulating frequency source 124 and having an amplitude determined by the green video signal from green video source 125. The green video signal is an inverse signal having an amplitude which is a minimum when the intensity of the green is a maximum. The frequency of the source 124 is high relative to the other two oscillators 111 and 116 and may be in the order of 48 megacycles. The wobbulation of the beam at a high frequency rate results in a spreading or blurring of the beam in a vertical direction whereby a depth of modulation of the light modulating medium is produced which is in inverse relationship to the magnitude of such wobbulation. The combined effect of this color modulating system is to produce a grating orthogonal to the red and blue grating capable of projecting the green color information on a screen in point by point correspondence with the information written on the medium. A system of this general type is described in detail in the aforementioned Patent No. 3,305,630. The manner in which the deformed medium cooperates with an optical system to project the written information is also fully described in aforementioned Patent No. 3,305,630.

While in connection with the system of FIGURE 2 the modulation of the grating provided by the horizontal scan lines was accomplished by wobbulating the electron beam in a direction orthogonal thereto it should be understood that the modulation of such grating may be accomplished by applying a video signal directly to the vertical plates of the electrode set 38 to essentially focus modulate the beam in this direction and thereby alter the charge deposited on the light modulating medium 10 to cause the amplitude of the grating to vary in accordance with the amplitude of the video signal. Also, if desired, in place of the push-pull modulation arrangement shown in FIGURE 2 a single ended output may have been applied to the vertical deflection plates 42 and 43 to produce the desired modulation.

It will be understood that, if desired, focus modulation of the beam by the red and blue video signals also could accomplish the desired modulation in amplitude of red and blue diffraction gratings formed by constant amplitude red and blue grating forming carrier frequencies.

One advantage of the system of FIGURE 2 for the application of predeflection as well as modulating voltages to a set of electrodes such as set 38 which are closely spaced to the electron beam path of the system is that voltages of small amplitude may be used to produce the desired predeflection and modulation of the electron beam. Also, in view of the fact that the electron beam is not deviated by such voltages substantially from a central region encompassed by the electrodes of such set, single-ended, as distinguished from the push-pull modulating voltages, may be applied thereto without producing undesired asymmetrical modulating effects as when modulating voltages are applied to electrodes which are substantially spaced from the undesired electron beam path. Further, in view of the fact that the electrode system of such set is essentially at ground potential, coupling capacitors for coupling modulating voltages to such electrode systems need not have high voltage breakdown ratings. Overall, in such a system the application of predeflection and modulating voltages is greatly simplified over prior art systems.

FIGURE 3 shows a modification of the system of FIGURE 2. The same numerals as used in FIGURE 2 are used in FIGURE 3 to indicate corresponding parts. It is important in intelligence modulation systems of the kind to which the present invention is directed that the electron beam be uniformly focused and scanned over the entire raster area of the system with aberrations kept to a minimum. In oder to provide such precisely focused and scanned electron beam, in the system of FIGURE 3 predeflection voltages are also applied to the additional set 41 of electrodes between set 38 and 39. Horizontal predeflection voltages of appropriate amplitude and in phase with respect to the predeflection voltages applied to electrodes 44 and 45 are applied to horizontal plates 52 and 53 by means of a network consisting of voltage dividing resistors 130 and 131 connected across one output terminal and ground of the horizontal deflection amplifier 88 and by a pair of voltage dividing resistors 132 and 133 connected across the other output terminal and ground of the horizontal deflection amplifier 88. The junction point of resistance 130 and 131 is connected to horizontal deflection plate 52 and the junction point of resistance 132 and 133 is connected to the other horizontal deflection plate 53. Similarly, the output of vertical deflection amplifier 89 is connected to electrodes 50 and 51 by means of the voltage divider networks, consisting of resistances 136 and 137 and by means of voltage divider consisting of resistances 139 and 140, respectively. The additional predeflection control provided by the deflection voltages applied to the electrodes of set 41 enable the electron beam to be accurately positioned with respect to the deflection and focus field produced by the electrodes of system 39 to achieve a precisely focused and uniformly deflected beam at the modulating medium 10. If desired the predeflection voltages applied to set 41 may be applied in phase opposition relationship.

In a system such as the system of FIGURE 2 in which the modulating voltages producing the orthogonally disposed grating are applied to the electrodes of one set, interaction may occur between the signals which result in the modulation information intended for one set of grating appearing on an orthogonally arranged set. In order to avoid such problems another modification has been made in the system of FIGURE 2 and appears in FIGURE 3. In the system of FIGURE 3 the signal producing the modulation in the green diffraction grating is removed from the vertical deflection plates 42 and 43 of set 38 and applied to the vertical deflection plates 46 and 47 of set 39. Of course, if desired, the modulating signals producing the vertically oriented grating could have been removed from the electrodes 44 and 45 of set 38 and applied to the corresponding set of electrodes 48 and 49 of set 39 in place of the signals modulating the horizontally oriented diffraction grating.

A particular advantage of the arrangement described is that the electrodes of set 41 being at or close to D-C ground shield the electrodes of set 38 from set 39 and thus avoid interaction of the modulating signals and in addition, as the modulating signals are applied to electrodes in different sets cross coupling of such signals is avoided. Another advantage in the arrangement described is that the signal modulating the horizontally oriented grating is applied to the appropriate electrodes of the set which has greatest sensitivity, namely set 39, as between sets 39 and 41, thus requiring smaller amplitude in such signal as required for corresponding electrodes of set 41. However, if desired the signal modulating the horizontally oriented grating could have been applied to the vertical deflection electrodes of set 41.

While I have described and claimed a particular embodiment of my invention, it will be apparent to those skilled in the art that changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said sources to said electron receiving surface, means applying periodic deflection voltages to the opposed pairs of electrodes in both of said sets of electrodes to deflect said beam over an area of said electron receiving surface, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency modulating signal to a pair of electrodes of said first set.

2. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the period of one of said deflection voltages being substantially greater than the period of the other of said deflection voltages, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency signal to the pair of said electrodes of said first set to which said deflection voltage of said one period are applied, said high frequency signal being a video signal.

3. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the period of one of said deflection voltages being substantially greater than the period of the other of said deflection voltages, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency signal and a video signal to the pair of said electrodes of said first set to which said deflection voltage of said other period are applied.

4. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the period of one of said deflection voltages being substantially greater than the period of the other of said deflection voltages, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency signal to a pair of electrodes of said first set to which deflection voltage of said other period is applied, said high frequency signal being a high frequency carrier wave modulated by a video signal.

5. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency signal to a pair of electrodes of said first set, the frequency of said signals being substantially greater than the frequency of said periodic deflection voltages, the amplitude of said high frequency signal being such that the amplitude of deflection of said electrons at said receiving surface produced thereby is substantially smaller than the amplitude of deflection of said electron at said receiving surface produced by said periodic deflection voltage.

6. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying each of a pair of high frequency signals modulated in amplitude by corresponding video signals to a pair of electrodes of said first set, means for applying a third high frequency signal modulated in amplitude by a third video signal to the other pair of opposed electrodes of said first set, the frequency of said signals being substantially greater than the frequency of said periodic deflection voltages, the amplitude of deflection of said electrons at said receiving surface produced by said signals being substantially smaller than the amplitude of deflection of said electrons at said receiving surface produced by said periodic deflection voltage.

7. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying each of a pair of high frequency signals modulated in amplitude by corresponding video signals to a respective pair of electrodes of said first set, means for applying a video signal to the other pair of opposed electrodes of said first set, the frequency of said signals being substantially greater than the frequency of said periodic deflection voltages, the amplitude of deflection of said electrons at said receiving surface produced by said signals being substantially smaller than the amplitude of deflection of said electrons at said receiving surface produced by said periodic deflection voltage.

8. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the period of one of said deflection voltages being substantially greater than the period of the other of said deflection voltages, the deflection produced by said first set of electrodes providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, means for applying a high frequency signal modulated in amplitude by a corresponding video signal to the pair of electrodes of said first set to which the deflection voltage of said other period are applied, means for applying a second high frequency signal modulated in amplitude by a second video signal to the pair of opposed electrodes of said second set to which the deflection voltage of said one period is applied, the frequency of said signals being substantially greater than the frequency of said periodic deflection voltages, the amplitude of deflection of said electrons at said receiving surface produced by said signals being substantially smaller than the amplitude of deflection of said electrons at said receiving surface produced by said periodic deflection voltage.

9. An electron beam system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of electrodes to focus the electrons traveling from said source to said electron receiving surface, means applying periodic deflection voltages to the opposed pairs of electrodes in both of said sets of electrodes to deflect said beam over an area of said electron receiving surface, the deflection produced by said first set of electrons providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, an additional set of four electrodes interposed between said first and second set of electrodes having their centers lying substantially in a single plane transverse to the electron path between said source and said electron receiving surface and with said four electrodes thereof positioned to provide othogonally arranged pairs of electrodes, means for applying a third deflection voltage to said pair of opposed electrodes of said additional set to modify the predeflection produced by a corresponding pair of electrodes of said first set.

10. An electron beam deflection and focusing system comprising an electron source, an electron receiving surface, means accelerating electrons emanating from said source toward said electron receiving surface and electrostatic means interposed between said source and said electron receiving surface for focusing said electrons and deflecting them over an area of said electron receiving surface comprising a first set of four electrodes and a second set of four electrodes longitudinally spaced therefrom in the direction of electron travel with the electrodes of each set of four electrodes having their centers lying substantially in a single plane transverse to the electron path between said source and said electron receiving surface and with said four electrodes of each set positioned to provide orthogonally arranged pairs of electrodes, means for maintaining said first set of electrodes and said electron receiving surface at a direct current voltage which is substantially positive with respect to the direct current voltage applied to said second set of of electrodes to focus the electrons traveling from said source to said electron receiving surface, means applying periodic deflection voltages to the opposed pairs of electrodes in both of said sets of electrodes to deflect said beam over an area of said electron receiving surface, the deflection produced by said first set of electrons providing a predeflection of the beam in the same direction as caused by said second set of deflecting electrodes to compensate for the asymmetry of the focusing field produced by the deflection voltages on said second set of deflection electrodes and thereby minimize the deflection aberration at said electron receiving surface, the electrodes of said first set being substantially closer to the undeflected path of electrons accelerated from said electron source to said electron receiving surface than said second set of electrodes, an additional set of four electrodes interposed between said first and second set of electrodes having their centers lying substantially in a single plane transverse to the electron path between said source and said electron receiving surface and with said four electrodes thereof positioned to provide orthogonally arranged pairs of electrodes, means for applying a third deflection voltage to said pair of opposed electrodes of said additional set to modify the predeflection produced by a corresponding pair of electrodes of said first set, means for applying a high frequency signal to a pair of opposed electrodes of said first set, means for applying another high frequency modulating signal to an orthogonally disposed pair of electrodes of one of the other sets of electrodes.

References Cited

UNITED STATES PATENTS 3,320,468 5/1967 Glenn ............... 315—14

RODNEY D. BENNETT, *Primary Examiner.*

T. H. TUBBESING, *Assistant Examiner.*

U.S. Cl. X.R.

315—17, 22, 24, 26